(12) United States Patent
Takemori et al.

(10) Patent No.: US 11,212,109 B2
(45) Date of Patent: Dec. 28, 2021

(54) DATA PROVISION SYSTEM, DATA SECURITY DEVICE, DATA PROVISION METHOD, AND COMPUTER PROGRAM

(71) Applicant: KDDI CORPORATION, Tokyo (JP)

(72) Inventors: Keisuke Takemori, Tokyo (JP);
Seiichiro Mizoguchi, Tokyo (JP);
Ayumu Kubota, Tokyo (JP)

(73) Assignee: KDDI CORPORATION, Tokyo (JP)

(*) Notice: Subject to any disclaimer, the term of this patent is extended or adjusted under 35 U.S.C. 154(b) by 96 days.

(21) Appl. No.: 16/307,394

(22) PCT Filed: Apr. 11, 2017

(86) PCT No.: PCT/JP2017/014794
§ 371 (c)(1),
(2) Date: Dec. 5, 2018

(87) PCT Pub. No.: WO2018/029905
PCT Pub. Date: Feb. 15, 2018

(65) Prior Publication Data
US 2019/0305962 A1 Oct. 3, 2019

(30) Foreign Application Priority Data
Aug. 10, 2016 (JP) .............................. JP2016-158120

(51) Int. Cl.
*H04L 9/32* (2006.01)
*G06F 21/60* (2013.01)
(Continued)

(52) U.S. Cl.
CPC .......... *H04L 9/3247* (2013.01); *G06F 21/602* (2013.01); *G06F 21/64* (2013.01);
(Continued)

(58) Field of Classification Search
CPC ... H04L 9/08; H04L 9/088; H04L 9/30; H04L 9/32; H04L 9/3242; H04L 9/3247; G06F 21/602
(Continued)

(56) References Cited

U.S. PATENT DOCUMENTS

2001/0002814 A1  6/2001  Suganuma et al.
2009/0126028 A1  5/2009  Traenkenschuh et al.
(Continued)

FOREIGN PATENT DOCUMENTS

CN  102495601 A  6/2012
CN  104010302 A  8/2014
(Continued)

OTHER PUBLICATIONS

AN4240 Application note, "Introduction to the Cryptographic Service Engine (CSE) module for SPC56ECxx and SPC564Bxx devices" STMicroelectronics, http://www.st.com/web/en/resource/technical/document/application_note/DM00075575.pdf , Aug. 3, 2016.
(Continued)

Primary Examiner — Dant B Shaifer Harriman
(74) Attorney, Agent, or Firm — Greenblum & Bernstein, P.L.C.

(57) ABSTRACT

A data provision system includes a data provision device and a data security device installed in a vehicle. The data provision device includes a vehicle interface configured to transmit data to and receive data from the vehicle; and an cryptographic processing unit configured to generate an electronic signature of application data to be applied to an in-vehicle computer installed in the vehicle by using a secret key of the data provision device, wherein application data with the electronic signature, which is obtained by attaching the electronic signature to the application data, is transmitted to the vehicle through the vehicle interface. The data secu-
(Continued)

rity device includes an interface unit configured to transmit data to and receive data from a device outside the data security device; and an cryptographic processing unit configured to verify the electronic signature of the application data with the electronic signature received from the data provision device.

5 Claims, 7 Drawing Sheets

(51) Int. Cl.
  *G06F 21/64* (2013.01)
  *H04L 9/08* (2006.01)
  *H04L 9/30* (2006.01)
  *H04W 12/03* (2021.01)
  *G06F 8/65* (2018.01)

(52) U.S. Cl.
  CPC ............... *H04L 9/08* (2013.01); *H04L 9/088* (2013.01); *H04L 9/30* (2013.01); *H04L 9/32* (2013.01); *H04L 9/3242* (2013.01); *H04W 12/03* (2021.01); *G06F 8/65* (2013.01); *H04L 2209/80* (2013.01); *H04L 2209/84* (2013.01)

(58) Field of Classification Search
  USPC ......................................................... 713/176
  See application file for complete search history.

(56) References Cited

U.S. PATENT DOCUMENTS

| | | | |
|---|---|---|---|
| 2011/0072266 | A1 | 3/2011 | Takayama et al. |
| 2012/0093312 | A1 | 4/2012 | Gammel et al. |
| 2012/0311340 | A1* | 12/2012 | Naganuma ............... G06F 21/74 713/176 |
| 2013/0219170 | A1 | 8/2013 | Naitou et al. |
| 2014/0108787 | A1* | 4/2014 | Ando ................... H04L 9/30 713/156 |
| 2014/0205095 | A1 | 7/2014 | Ittogi |
| 2015/0089236 | A1* | 3/2015 | Han ...................... H04W 12/10 713/181 |
| 2015/0113520 | A1* | 4/2015 | Kotani .................. G06F 8/65 717/172 |
| 2015/0113521 | A1 | 4/2015 | Suzuki et al. |
| 2015/0121071 | A1* | 4/2015 | Schwarz ................ H04L 63/08 713/168 |
| 2016/0330032 | A1* | 11/2016 | Naim ................... G06F 13/4282 |
| 2016/0378457 | A1* | 12/2016 | Adachi ................. G06F 11/00 713/181 |
| 2017/0060559 | A1* | 3/2017 | Ye ........................ H04L 63/061 |
| 2018/0048473 | A1* | 2/2018 | Miller ................... H04L 9/3247 |
| 2018/0074929 | A1* | 3/2018 | Kito .................... G06F 11/3006 |

FOREIGN PATENT DOCUMENTS

| | | |
|---|---|---|
| CN | 104601329 A | 5/2015 |
| JP | 2008-239021 A | 10/2008 |
| JP | 2011-108167 A | 6/2011 |
| JP | 2013-192091 A | 9/2013 |
| JP | 2014-514203 A | 6/2014 |
| JP | 2014-143568 A | 8/2014 |
| JP | 2015-103163 A | 6/2015 |
| JP | 2016-072675 A | 5/2016 |
| WO | 2012/130257 A1 | 10/2012 |
| WO | 2014/156328 A1 | 10/2014 |
| WO | 2015/186829 A1 | 6/2015 |

OTHER PUBLICATIONS

"Road Vehicles—Unified diagnostic services (UDS)—Part1: Specification and requirements," International Standard, ISO14229-1, Second Edition, Mar. 15, 2013.
Takemori, "In-vehicle Network Security Using Secure Elements—Discussion of Security Technologies—", IEICE Technical Report, vol. 114, No. 508, Mar. 2015, pp. 73-78.
Takemori et al., "Key Managements for ECU and Code Authentications Using Tamper-resistant Secure Element", IEICE Technical Report, vol. 115, No. 366, Dec. 10, 2015, pp. 227-232.
Takemori et al., "Protection for Automotive Control System Using Secure Boot and Authentication", IEICE Technical Report, Japan, Institute of Electronics, Information and Communication Engineers, vol. 114, No. 225, Sep. 12, 2014, pp. 47-54.
U.S. Appl. No. 16/307,681 to Keisuke Takemori et al., filed Dec. 6, 2018.
U.S. Appl. No. 16/307,414 to Keisuke Takemori et al., filed Dec. 5, 2018.
Notice of Reasons for Rejection issued in Japanese family member Patent Appl. No. 2016-158120, dated Apr. 4, 2017, along with an English translation thereof.
Notice of Allowance issued in Japanese family member Patent Appl. No. 2017-188122, dated May 15, 2018, along with an English translation thereof.
International Search Report issued in International Bureau of WIPO Patent Application No. PCT/JP2017/014794, dated Jul. 18, 2017, along with an English translation thereof.
Chinese First Office Action (including English Language Translation), dated Jan. 12, 2021 by the China National Intellectual Property Administration (CNIPA), for Chinese Application No. 201780035430.9.

\* cited by examiner

DATA PROVISION SYSTEM, DATA SECURITY DEVICE, DATA PROVISION METHOD, AND COMPUTER PROGRAM

TECHNICAL FIELD

The present invention relates to a data provision system, a data security device, a data provision method, and a computer program.

Priority is claimed on Japanese Patent Application No. 2016-158120, filed Aug. 10, 2016, the content of which is incorporated herein by reference.

BACKGROUND ART

Conventionally, a car has an electronic control unit (ECU), and implements a function such as engine control through the ECU. The ECU is a type of computer and implements a desired function through a computer program. For example, security technology for an in-vehicle control system configured by connecting a plurality of ECUs to a controller area network (CAN) is described in Non-Patent Document 1.

CITATION LIST

Non-Patent Literature

[Non-Patent Document 1]
Keisuke TAKEMORI, "In-vehicle Network Security Using Secure Elements: Discussion of Security Technologies", Institute of Electronics, Information and Communication Engineers, Technical Report, vol. 114, no. 508, pp. 73-78, March 2015

[Non-Patent Document 2]
STMicroelectronics, "AN4240 Application note", retrieved on Aug. 3, 2016, Internet <URL: http://www.st.com/web/en/resource/technical/document/application_note/DM00075575.p

[Non-Patent Document 3]
INTERNATIONAL STANDARD, ISO 14229-1, "Road vehicles Unified diagnostic services (UDS) Part 1: Specification and requirements", Second edition, 2013-03-15

SUMMARY OF INVENTION

Problem to be Solved by the Invention

An objective is to improve the reliability of data such as an update program to be applied to an ECU of an in-vehicle control system of a car.

The present invention has been made in consideration of such circumstances and an objective of the present invention is to provide a data provision system, a data security device, a data provision method, and a computer program capable of improving the reliability of data to be applied to an in-vehicle computer such as an ECU.

Means for Solving the Problem (1) One aspect of the present invention is a data provision system including: a data provision device; and a data security device installed in a vehicle, wherein the data provision device includes a vehicle interface configured to transmit data to and receive data from the vehicle; and an cryptographic processing unit configured to generate an electronic signature of application data to be applied to an in-vehicle computer installed in the vehicle by using a secret key of the data provision device, wherein application data with the electronic signature, which is obtained by attaching the electronic signature to the application data, is transmitted to the vehicle through the vehicle interface, and wherein the data security device includes an interface unit configured to transmit data to and receive data from a device outside the data security device; and an cryptographic processing unit configured to verify the electronic signature of the application data with the electronic signature received from the data provision device through the interface unit by using a public key of the data provision device, wherein the application data for which the verification of the electronic signature has succeeded is transmitted to the in-vehicle computer through the interface unit (2) In one aspect of the present invention, in the data provision system of (1), the data security device is configured to receive, from the in-vehicle computer through the interface unit, a data application result indicating success or failure of application of the application data, which is transmitted to the in-vehicle computer, to the in-vehicle computer and is configured to transmit the received data application result to the data provision device through the interface unit.

In one aspect of the present invention, the data security device may be configured to transmit the application data for which the verification of the electronic signature has succeeded and a message authentication code for the application data to the in-vehicle computer through the interface unit.

In one aspect of the present invention, the message authentication code may be a message authentication code related to a packet that is configured to store the application data for which the verification of the electronic signature has succeeded, and to be transmitted to the in-vehicle computer.

In one aspect of the present invention, the data security device may be configured to divide the application data for which the verification of the electronic signature has succeeded into a plurality of blocks, calculate the message authentication code for each block, and transmit the block and the message authentication code to the in-vehicle computer through the interface unit.

(3) One embodiment of the present invention is a data security device installed in a vehicle, which includes: an interface unit configured to transmit data to and receive data from a device outside the data security device; and an cryptographic processing unit configured to verify an electronic signature of application data with an electronic signature received from a data provision device through the interface unit by using a public key of the data provision device, wherein application data of the application data with the electronic signature for which the verification of the electronic signature has succeeded is transmitted to an in-vehicle computer installed in the vehicle through the interface unit.

(4) One aspect of the present invention is a data provision method for use in a data provision system including a data provision device and a data security device installed in a vehicle, the data provision method including: generating, by the data provision device, an electronic signature of application data to be applied to an in-vehicle computer installed in the vehicle by using a secret key of the data provision device; transmitting, by the data provision device, application data with the electronic signature, which is obtained by attaching the electronic signature to the application data, to the vehicle through a vehicle interface configured to transmit data to and receive data from the vehicle; verifying, by the data security device, the electronic signature of the application data with the electronic signature received from the data provision device through an interface unit configured to transmit data to and receive data from a device outside the data security device by using a public key of the data provision device; and transmitting, by the data security device, the application data for which the verification of the electronic signature has succeeded to the in-vehicle computer through the interface unit.

(5) One aspect of the present invention is a computer program for causing a computer of a data security device installed in a vehicle to execute a process of: verifying an electronic signature of application data with an electronic signature received from a data provision device through an interface unit configured to transmit data to and receive data from a device outside the data security device by using a public key of the data provision device; and transmitting application data of the application data with the electronic signature for which the verification of the electronic signature has succeeded to an in-vehicle computer installed in the vehicle through the interface unit.

Advantageous Effects of Invention

According to the present invention, it is possible to improve reliability of data to be applied to an in-vehicle computer such as an ECU.

DESCRIPTION OF EMBODIMENTS

Hereinafter, embodiments of the present invention will be described with reference to the drawings. Also, in the following embodiments, an example in which a car is used as a vehicle will be described.

Figure 1:
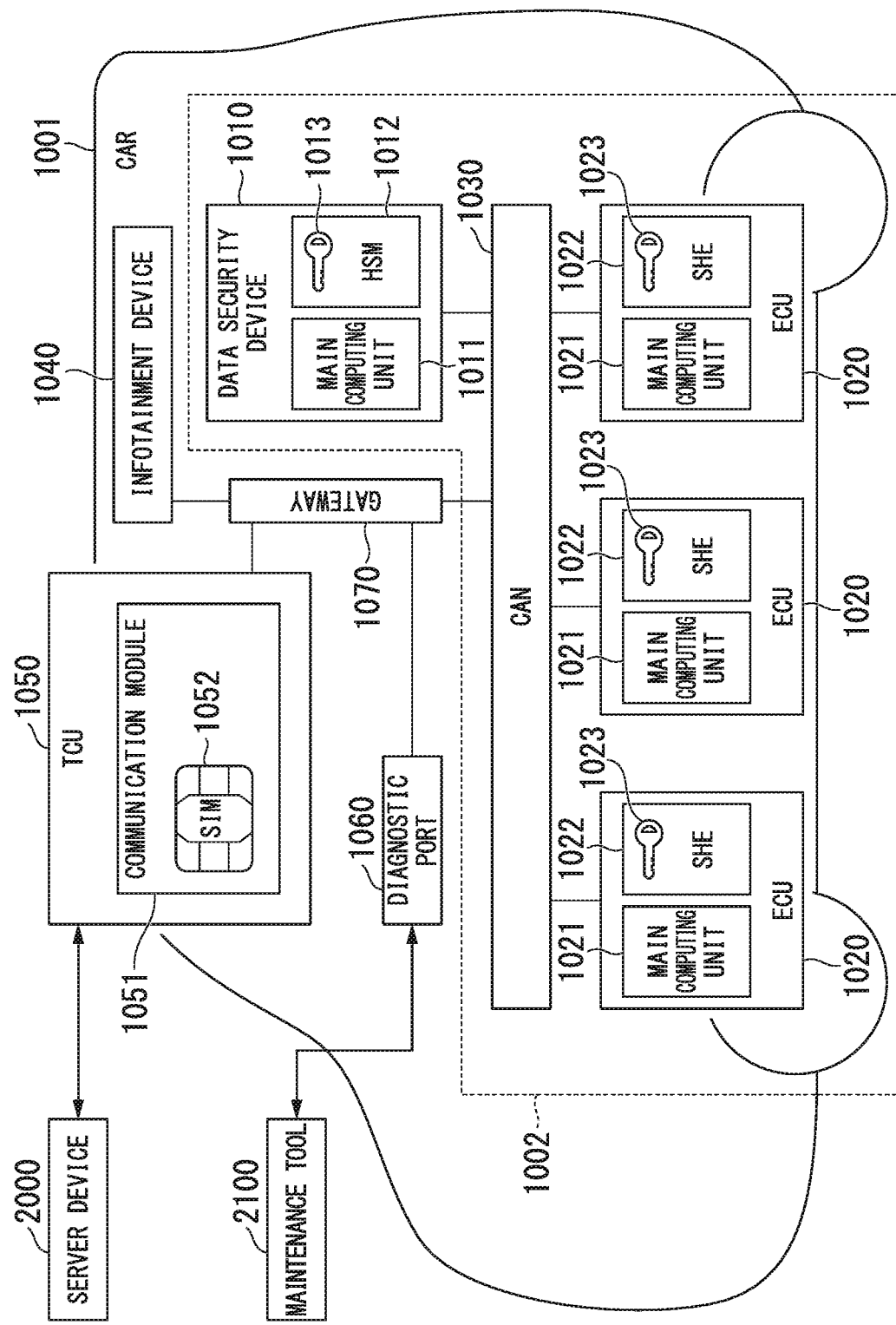
FIG. 1 is a diagram showing an example of a configuration of a data provision system and a car 1001 according to an embodiment.

FIG. 1 is a diagram showing an example of a configuration of a data provision system and a car 1001 according to an embodiment. In the present embodiment, an electronic control unit (ECU) installed in the car 1001 will be described as an example of an in-vehicle computer.

In FIG. 1, the car 1001 includes a data security device 1010 and a plurality of ECUs 1020. The ECU 1020 is an in-vehicle computer provided in the car 1001. The ECU 1020 has a control function such as engine control of the car 1001. Examples of the ECU 1020 include an ECU having an engine control function, an ECU having a steering-wheel control function, an ECU having a brake control function, and the like. The data security device 1010 has a function of data security (security) applied to the ECU 1020 installed in the car 1001.

Also, any ECU installed in the car 1001 may function as the data security device 1010.

The data security device 1010 and the plurality of ECUs 1020 are connected to a controller area network (CAN) 1030 provided in the car 1001. The CAN 1030 is a communication network. The CAN is known as one of communication networks installed in vehicles. The data security device 1010 exchanges data with each ECU 1020 via the CAN 1030. The ECU 1020 exchanges data with other ECUs 1020 via the CAN 1030.

Also, as a communication network installed in the vehicle, a communication network other than a CAN may be provided in the car 1001, and the exchange of data between the data security device 1010 and the ECU 1020 and the exchange of data between the ECUs 1020 may be performed via a communication network other than a CAN. For example, the car 1001 may include a local interconnect network (LIN). Also, the CAN and the LIN may be provided in the car 1001. Also, the ECU 1020 connected to the LIN may be provided in the car 1001. Also, the data security device 1010 may be connected to the CAN and the LIN. Also, the data security device 1010 may exchange data with the ECU 1020 connected to the CAN via the CAN, and exchange data with the ECU 1020 connected to the LIN via the LIN. Also, the ECUs 1020 may exchange data with each other via the LIN.

An in-vehicle computer system 1002 provided in the car 1001 is configured by connecting the data security device 1010 and the plurality of ECUs 1020 to the CAN 1030. In the present embodiment, the in-vehicle computer system 1002 functions as an in-vehicle control system of the car 1001.

A gateway 1070 monitors communication between the inside and the outside of the in-vehicle computer system 1002. The gateway 1070 is connected to the CAN 1030. As examples of a device outside the in-vehicle computer system 1002, the gateway 1070 may be connected to an infotainment device 1040, a telecommunication unit (TCU) 1050, and a diagnostic port 1060. The data security device 1010 and the ECU 1020 communicate with devices outside the in-vehicle computer system 1002 via the gateway 1070.

Also, in the configuration of the CAN 1030, the CAN 1030 may include a plurality of buses (communication lines) and the plurality of buses may be connected to the gateway 1070. In this case, one or more ECUs 1020 are connected to one bus. Also, the data security device 1010 and the ECU 1020 may be connected to the same bus or a bus to which the data security device 1010 is connected and a bus to which the ECU 1020 is connected may be separately provided.

The car 1001 includes the diagnostic port 1060. For example, an on-board diagnostics (OBD) port may be used as the diagnostic port 1060. A device outside the car 1001 can be connected to the diagnostic port 1060. A device outside the car 1001 connectable to the diagnostic port 1060 is, for example, a maintenance tool 2100 shown in FIG. 1 or the like. Data is exchanged between the data security device 1010 and a device connected to the diagnostic port 1060, for example, the maintenance tool 2100, via the diagnostic port 1060 and the gateway 1070. The maintenance tool 2100 may have a function of a conventional diagnostic terminal connected to the OBD port.

The car 1001 includes the infotainment device 1040. Examples of the infotainment device 1040 include those having a navigation function, a position information service function, a multimedia playback function for music, movies, and the like, a speech communication function, a data communication function, an Internet connection function, and the like.

The car 1001 includes the TCU 1050. The TCU 1050 is a communication device. The TCU 1050 includes a communication module 1051. The communication module 1051 performs wireless communication using a wireless communication network. The communication module 1051 includes a subscriber identity module (SIM) 1052. The SIM 1052 is an SIM in which information for using the wireless communication network is written. By using the SIM 1052, the communication module 1051 can be connected to the wireless communication network to perform wireless communication. Also, an embedded subscriber identity module (eSIM) may be used as the SIM 1052.

The data security device 1010 exchanges data with the TCU 1050 via the gateway 1070. Also, the TCU 1050 and the data security device 1010 may be directly connected via a communication cable and the TCU 1050 and the data security device 1010 may exchange data via the communication cable. For example, the TCU 1050 and the data security device 1010 may be directly connected through a universal serial bus (USB) cable and the TCU 1050 and the data security device 1010 may exchange data via the USB cable. Also, if the TCU 1050 and the data security device 1010 are directly connected via a communication cable such as a USB cable and exchange of data between the TCU 1050 and the data security device 1010 via the communication cable is performed, a transmission-side device of the TCU 1050 and the data security device 1010 may include a buffer configured to temporarily store data to be transmitted to a reception side device.

Also, as another connection form of the TCU 1050, for example, the TCU 1050 may be connected to the infotainment device 1040 and the data security device 1010 may exchange data with the TCU 1050 via the gateway 1070 and the infotainment device 1040. Alternatively, the TCU 1050 may be connected to the diagnostic port 1060 and the data security device 1010 may exchange data with the TCU 1050 connected to the diagnostic port 1060 via the gateway 1070 and the diagnostic port 1060. Alternatively, the data security device 1010 may include a communication module 1051 including the SIM 1052. When the data security device 1010 includes the communication module 1051 including the SIM 1052, the car 1001 may not include the TCU 1050.

The data security device 1010 includes a main computing unit 1011 and a hardware security module (HSM) 1012. The main computing unit 1011 executes a computer program for implementing a function of the data security device 1010. The HSM 1012 has a cryptographic processing function and the like. The HSM 1012 is tamper resistant. The HSM 1012 is an example of a secure element (SE). The HSM 1012 includes a storage unit 1013 configured to store data. The main computing unit 1011 uses the HSM 1012.

The ECU 1020 includes a main computing unit 1021 and a secure hardware extension (SHE) 1022. The main computing unit 1021 executes a computer program configured to implement the function of the ECU 1020. The SHE 1022 has a cryptographic processing function and the like. The SHE 1022 is tamper resistant. The SHE 1022 is an example of a secure element. The SHE 1022 includes a storage unit 1023 configured to store data. The main computing unit 1021 uses the SHE 1022.

The server device 2000 transmits data to and receives data from the communication module 1051 of the TCU 1050 of the car 1001 via a communication circuit. The server device 2000 transmits data to and receives data from the communication module 1051 via a wireless communication network used by the communication module 1051 of the TCU 1050 of the car 1001. Alternatively, the server device 2000 may transmit and receive data to and from the communication module 1051 via a communication network such as the Internet and a wireless communication network. Also, for example, the server device 2000 and the communication module 1051 may be connected via a dedicated circuit such as a virtual private network (VPN) circuit and data may be transmitted and received through the dedicated circuit. For example, the dedicated circuit such as the VPN circuit may be provided by a wireless communication network corresponding to the SIM 1052. Also, the server device 2000 and the car 1001 may be connected through a communication cable. For example, the server device 2000 and the gateway 1070 of the car 1001 may be connected together through a communication cable.

The server device 2000 provides an ECU code to be applied to the ECU 1020 to the car 1001. The ECU code is an example of data to be applied to the ECU 1020. The ECU code may be a computer program such as an update program installed in the ECU 1020 or setting data such as a parameter setting value set in the ECU 1020.

Figure 2:
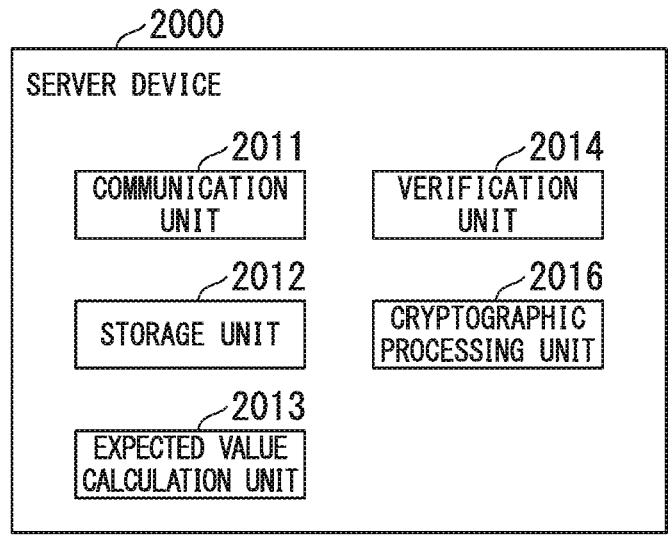
FIG. 2 is a diagram showing an example of a configuration of a server device 2000 according to an embodiment.

FIG. 2 is a diagram showing an example of a configuration of the server device 2000. In FIG. 2, the server device 2000 includes a communication unit 2011, a storage unit 2012, an expected value calculation unit 2013, a verification unit 2014, and a cryptographic processing unit 2016. The communication unit 2011 communicates with other devices via a communication circuit. The communication unit 2011 corresponds to a vehicle interface. The storage unit 2012 stores data. The expected value calculation unit 2013 calculates an expected value for the ECU code. The verification unit 2014 performs a process related to the verification of a measurement value of the ECU 1020. The cryptographic processing unit 2016 performs an encryption process. The encryption process of the cryptographic processing unit 2016 includes at least an electronic signature generation process. Further, the encryption process of the cryptographic processing unit 2016 may include a data encryption process and an encrypted data decryption process.

Functions of the server device 2000 are implemented by a central processing unit (CPU) included in the server device 2000 executing a computer program. Also, the server device 2000 may be configured using a general-purpose computer device or may be configured as a dedicated hardware device.

Figure 3:
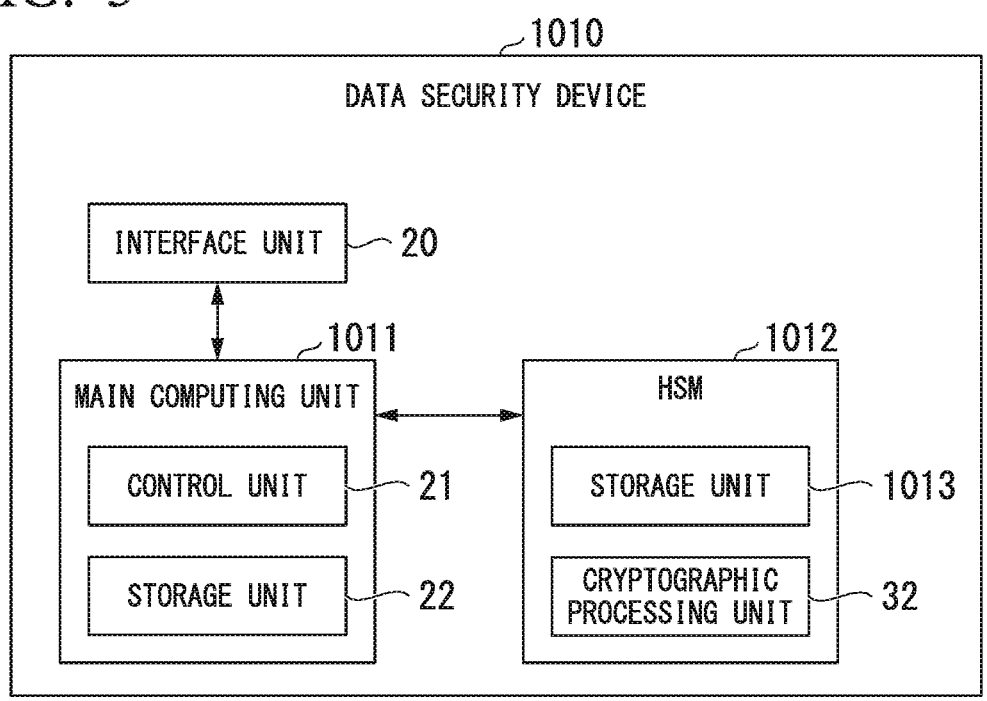
FIG. 3 is a diagram showing an example of a configuration of a data security device 1010 according to an embodiment.

FIG. 3 is a diagram showing an example of a configuration of the data security device 1010. In FIG. 3, the data security device 1010 includes a main computing unit 1011, an HSM 1012, and an interface unit 20. The main computing unit 1011 includes a control unit 21 and a storage unit 22. The HSM 1012 includes a storage unit 1013, and a cryptographic processing unit 32.

The interface unit 20 transmits data to and receives data from a device outside its own data security device 1010. The interface unit 20 includes an interface configured to transmit and receive data via the CAN 1030. The main computing unit 1011 transmits data to and receives data from a device other than the data security device 1010 via the interface unit 20.

The control unit 21 controls the data security device 1010. The storage unit 22 stores data. The storage unit 1013 stores data. The cryptographic processing unit 32 performs an encryption process. The encryption process of the cryptographic processing unit 32 includes at least an electronic signature verification process. Further, the encryption process of the cryptographic processing unit 32 may include a data encryption process and an encrypted data decrypting process.

Figure 4:
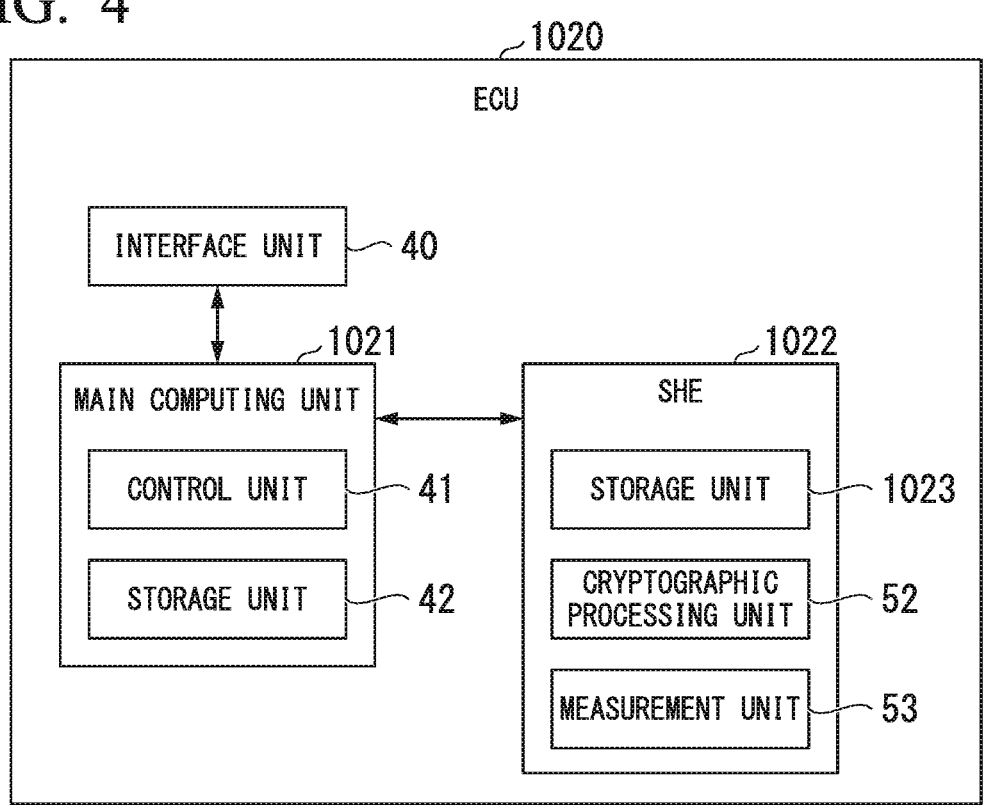
FIG. 4 is a diagram showing an example of a configuration of an ECU 1020 according to an embodiment.

FIG. 4 is a diagram showing an example of a configuration of the ECU 1020. In FIG. 4, the ECU 1020 includes a main computing unit 1021, an SHE 1022, and an interface unit 40. The main computing unit 1021 includes a control unit 41 and a storage unit 42. The SHE 1022 includes a storage unit 1023, a cryptographic processing unit 52, and a measurement unit 53.

The interface unit 40 transmits data to and receives data from a device outside its own ECU 1020. The interface unit 40 has an interface configured to transmit and receive data via the CAN 1030. The main computing unit 1021 transmits data to and receives data from a device other than its own ECU 1020 via the interface unit 40.

The control unit 41 controls the ECU 1020. The storage unit 42 stores data. The storage unit 1023 stores data. The cryptographic processing unit 52 encrypts data and decrypts encrypted data. The measurement unit 53 calculates a measurement value of data such as an ECU code and verifies the measurement value on the basis of the expected value.

Also, in the present embodiment, an HSM is used in the data security device 1010, but the data security device 1010 may use an SHE instead of the HSM. The SHE is described in, for example, Non-Patent Document 2.

Figure 5:
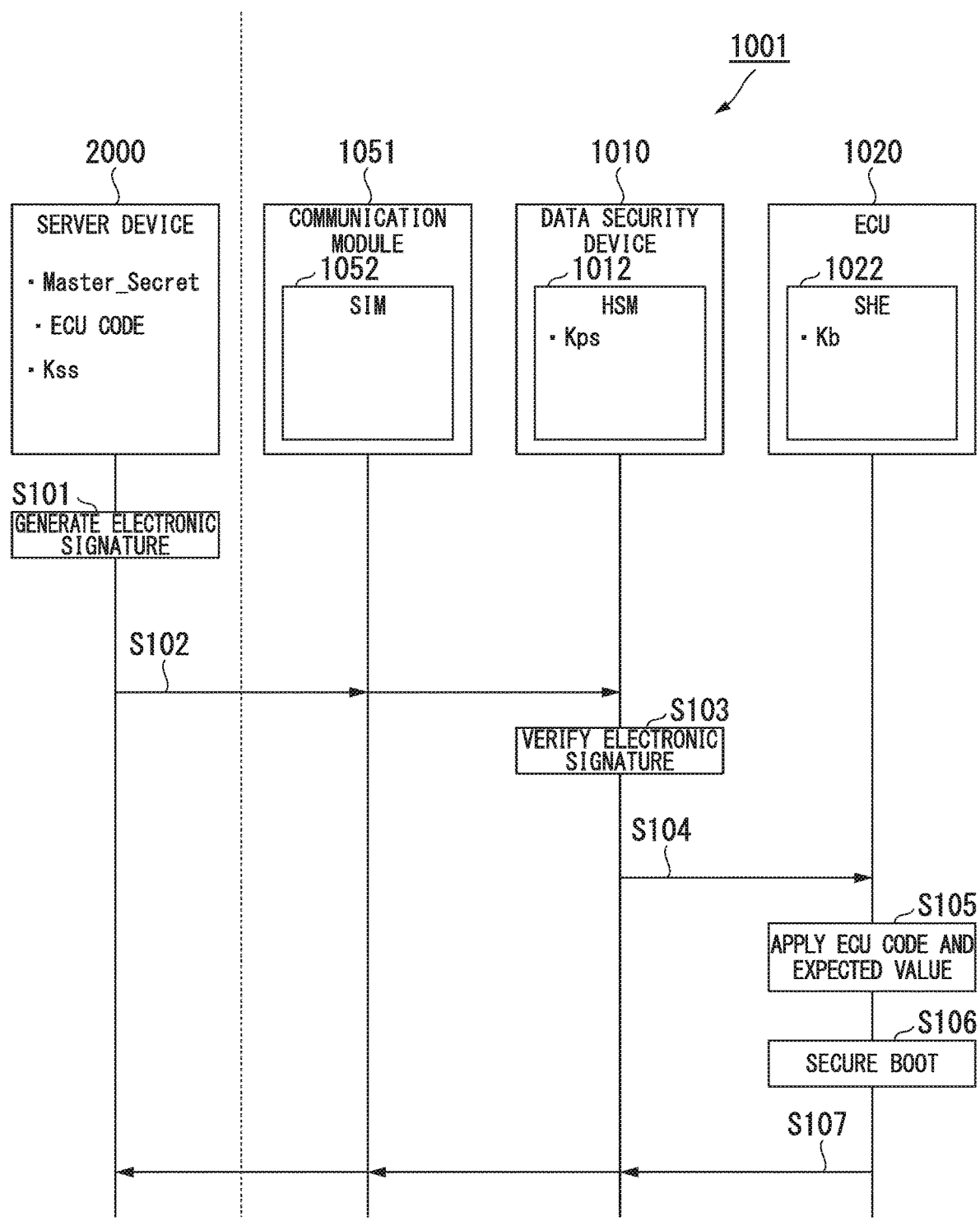
FIG. 5 is a sequence chart showing an example of a data provision method according to an embodiment.

Next, an example of a data provision method according to the present embodiment will be described with reference to FIG. 5. FIG. 5 is a sequence chart showing the example of the data provision method according to the present embodiment.

The server device 2000 pre-stores a master key Master_Secret, an ECU code of the ECU 1020, and a secret key Kss of the server device 2000 in the storage unit 2012. The ECU code of the ECU 1020 includes an ECU code to be applied to the ECU 1020. The data security device 1010 pre-stores a public key Kps of the server device 2000 in the storage unit 1013 of the HSM 1012. The public key Kps may be stored in the storage unit 1013 as a public key certificate. The ECU 1020 pre-stores a signature key Kb in the storage unit 1023 of the SHE 1022.

Hereinafter, the server device 2000 communicates with the TCU 1050 of the car 1001 through the communication unit 2011 and transmits data to and receives data from the data security device 1010 connected to the CAN 1030 of the car 1001 via the TCU 1050 and the gateway 1070. An encryption communication path may be used as a communication path between the server device 2000 and the data security device 1010. For example, the server device 2000 and the data security device 1010 may perform hypertext transfer protocol secure (https) communication as an example of the encryption communication path.

(Step S101) The cryptographic processing unit 2016 of the server device 2000 generates an electronic signature with respect to the ECU code applied to the ECU 1020 and an expected value of the ECU code using the secret key Kss. The expected value of the ECU code is an expected value used for secure boot of the ECU 1020. The expected value of the ECU code is an example of data applied to the ECU 1020. The expected value of the ECU code may be associated with the ECU code and stored in the storage unit 2012 in advance or the expected value calculation unit 2013 may calculate the expected value of the ECU code. In the present embodiment, a cipher-based message authentication code (CMAC) is used as an example of the expected value of the ECU code. The signature key Kb of the ECU 1020 is used to calculate the CMAC which is the expected value of the ECU code. When the expected value calculation unit 2013 calculates the expected value of the ECU code, the signature key Kb of the ECU 1020 is shared between the ECU 1020 and the server device 2000 in advance.

(Step S102) The server device 2000 transmits the ECU code applied to the ECU 1020, the expected value of the ECU code, and the electronic signature generated by the cryptographic processing unit 2016 to the data security device 1010 through the communication unit 2011. The data security device 1010 receives the ECU code, the expected value of the ECU code, and the electronic signature transmitted from the server device 2000.

Meanwhile, the electronic signature may be attached to both the ECU code and the expected value or attached to any one of the ECU code and the expected value.

(Step S103) The control unit 21 of the data security device 1010 causes the HSM 1012 to perform verification of the electronic signature received from the server device 2000. The cryptographic processing unit 32 of the HSM 1012 verifies the electronic signature using the public key Kps stored in the storage unit 1013. The HSM 1012 transfers the electronic signature verification result to the control unit 21. The control unit 21 proceeds to the process of step S104 when the electronic signature verification result is successful. On the other hand, the control unit 21 ends the process of FIG. 5 when the electronic signature verification result is failure.

Meanwhile, the control unit 21 may perform predetermined error processing when the electronic signature verification result is failure. For example, the control unit 21 may transmit an error message indicating that the result of verification of the electronic signature is failure to the server device 2000. The server device 2000 may perform predetermined error processing according to the error message. For example, the server device 2000 may retransmit the ECU code, the expected value of the ECU code and the electronic signature to the data security device 1010 or regenerate the electronic signature and then transmit the ECU code, the expected value of the ECU code and the electronic signature to the data security device 1010.

(Step S104) The control unit 21 of the data security device 1010 transmits an ECU code and an expected value for which the verification of electronic signature has succeeded to the ECU 1020 through the interface unit 20. The ECU 1020 receives the ECU code and the expected value transmitted from the data security device 1010.

(Step S105) The control unit 41 of the ECU 1020 applies the ECU code and the expected value received from the data security device 1010 to the ECU 1020. The control unit 41 sets the expected value in the SHE 1022 as an expected value used in the secure boot. The storage unit 1023 of the SHE 1022 stores the expected value.

(Step S106) The control unit 41 of the ECU 1020 executes the secure boot after application of the ECU code. In this secure boot, the measurement unit 53 of the SHE 1022 calculates a measurement value of the ECU code by using the signature key Kb stored in the storage unit 1023. In the present embodiment, a CMAC is used as an example of the measurement value. Accordingly, the measurement unit 53 calculates the CMAC of the ECU code by using the signature key Kb stored in the storage unit 1023. The measurement unit 53 compares the CMAC which is a calculation result with the expected value stored in the storage unit 1023. A secure boot result is success if a result of the comparison between the CMAC of the calculation result and the expected value indicates that the two match and a secure boot result is failure if the two do not match. The SHE 1022 transfers the secure boot result to the control unit 41. If the secure boot result is success, the control unit 41 advances execution of the ECU code. On the other hand, if the secure boot result is failure, the control unit 41 stops execution of the ECU code.

Meanwhile, although the server device 2000 provides an expected value used in the secure boot to the ECU 1020 in the present embodiment, the data security device 1010 may provide an expected value to the ECU 1020. In this case, the data security device 1010 has an expected value calculation unit and calculates an expected value (CMAC) of the ECU code using the signature key Kb of the ECU 1020. The signature key Kb of the ECU 1020 is shared between the ECU 1020 and the data security device 1010 in advance.

(Step S107) The control unit 41 of the ECU 1020 transmits a secure boot result "success or failure" to the data security device 1010 through the interface unit 40. The data security device 1010 transfers the secure boot result "success or failure" received from the ECU 1020 to the server device 2000. The secure boot result "success or failure" corresponds to a data application result indicating success or failure of application of the ECU code to the ECU 1020.

The server device 2000 receives the secure boot result "success or failure" transmitted from the data security device 1010 through the communication unit 2011. The server device 2000 executes a predetermined process in accordance with the secure boot result "success or failure" received from the data security device 1010. For example, if the secure boot result is a success, the success is recorded.

On the other hand, if the secure boot result is failure, the server device 2000 may execute predetermined error processing. For example, as the error processing, the server device 2000 may retransmit the ECU code, the expected value of the ECU code, and the electronic signature to the data security device 1010 or regenerate an electronic signature and then transmit the ECU code, the expected value of the ECU code, and the electronic signature to the data security device 1010. Further, the server device 2000 may repeat the error processing until the secure boot result becomes successful or repeat the error processing a predetermined number of times.

Also, the secure boot after the application of the ECU code of the above step S106 is not mandatory or may not be executed.

Next, modified examples of the above-described data provision method of FIG. 5 will be described.

Modified Example 1 of Data Provision Method

In step S104, the data security device 1010 encrypts an ECU code through the cryptographic processing unit 32 of the HSM 1012 and transmits the encrypted code to the ECU 1020. A key for use in encryption is pre-shared between the data security device 1010 and the ECU 1020. The ECU 1020 decrypts encrypted data received from the data security device 1010 with a corresponding key stored in the storage unit 1023 through the cryptographic processing unit 52 of the SHE 1022 and acquires the ECU code.

Modified Example 2 of Data Provision Method

In step S104, the ECU code is stored in a packet of the CAN 1030 and transmitted from the data security device 1010 to the ECU 1020. The data security device 1010 further includes a CMAC for the packet in the packet. A key for use in generation of the CMAC is pre-shared between the data security device 1010 and the ECU 1020. The ECU 1020 verifies the CMAC included in the packet received from data security device 1010 with a corresponding key. The ECU 1020 applies the ECU code if the verification of the CMAC has succeeded. On the other hand, the ECU 1020 does not apply the ECU code if the verification of the CMAC has failed.

Also, as the CMAC to be included in a packet storing an ECU code, the CMAC for all or a part of the ECU code may be used. For example, the data security device 1010 may divide the ECU code into blocks of a fixed size, calculate the CMAC for each block, and store the block and the CMAC in a packet. The ECU 1020 acquires the ECU code while verifying the CMAC for each block. A key for use in generation of the CMAC is pre-shared between the data security device 1010 and the ECU 1020.

Modified Example 3 of Data Provision Method

In step S107, the secure boot result "success or failure" transmitted from the ECU 1020 to the server device 2000 is set to a predetermined value. For example, success may be "1" and failure may be "0".

Modified Example 4 of Data Provision Method

In step S107, the secure boot result "success or failure" transmitted from the ECU 1020 to the server device 2000 is set as a CMAC of the ECU code of a calculation result in the secure boot in step S106. The verification unit 2014 of the server device 2000 calculates a CMAC of the ECU code transmitted to the ECU 1020 in step S102. The signature key Kb of the ECU 1020 is shared between the ECU 1020 and the server device 2000 in advance. The verification unit 2014 of the server device 2000 compares the CMAC of the calculation result with the CMAC of the secure boot result of the ECU 1020. The verification unit 2014 of the server device 2000 determines that the secure boot result of the ECU 1020 is success if a result of the comparison indicates that the two match and determines that the secure boot result of the ECU 1020 is failure if a result of the comparison indicates that the two do not match.

Modified Example 5 of Data Provision Method

The server device 2000 pre-supplies the ECU 1020 with a verification value (for example, a random number). In step S107, the ECU 1020 includes the verification value in the secure boot result "success" if the secure boot result is success and does not include the verification value in the secure boot result "failure" if the secure boot result is failure. The verification unit 2014 of the server device 2000 pre-compares the verification value included in the secure boot result "success" of the ECU 1020 with an original verification value pre-supplied to the ECU 1020. The verification unit 2014 of the server device 2000 determines that the secure boot result of the ECU 1020 is success if a result of the comparison indicates that the two match and determines that the secure boot result of the ECU 1020 is failure if a result of the comparison indicates that the two do not match.

Modified Example 6 of Data Provision Method

Any of modified examples 3, 4 and 5 of the above-described data provision method are combined and applied.

Modified Example 7 of Data Provision Method

In the above-described modified examples 3, 4, 5, and 6 of the data provision method, the ECU 1020 encrypts a secure boot result through the cryptographic processing unit 52 of the SHE 1022 and transmits the encrypted secure boot result to the server device 2000. A key for use in encryption is pre-shared between the server device 2000 and the ECU 1020. The server device 2000 decrypts encrypted data from the ECU 1020 with a corresponding key stored in the storage unit 2012 through the cryptographic processing unit 2016 and acquires the secure boot result. As a key for use in encryption, an encryption key usable by the SHE 1022 may be used only when the secure boot result is success. In this case, the secure boot result "success" may be encrypted with the encryption key.

Figure 6:
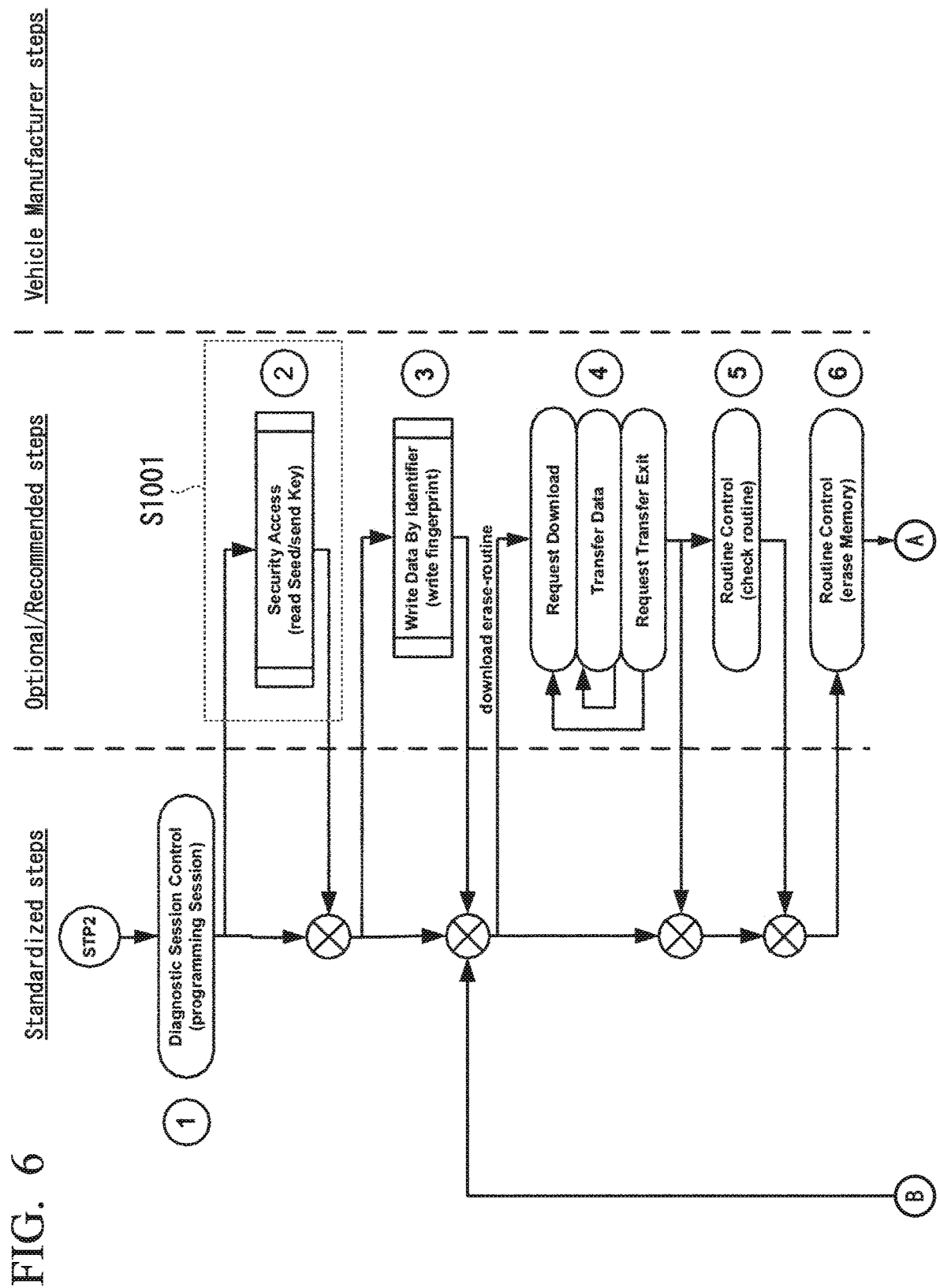
FIG. 6 is a flowchart showing a practical example of the data provision method according to an embodiment.
Figure 7:
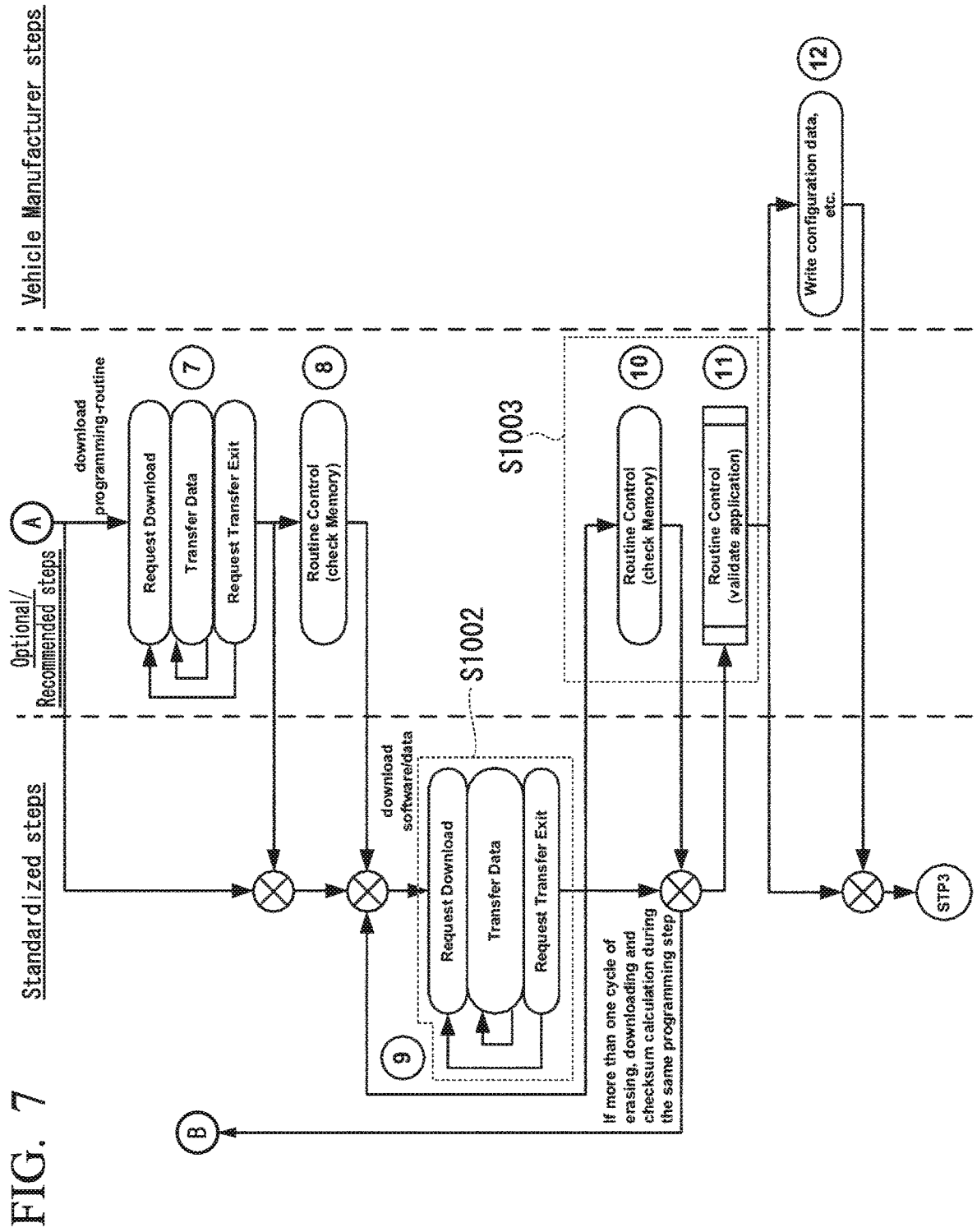
FIG. 7 is a flowchart showing a practical example of the data provision method according to an embodiment.
Figure 8:
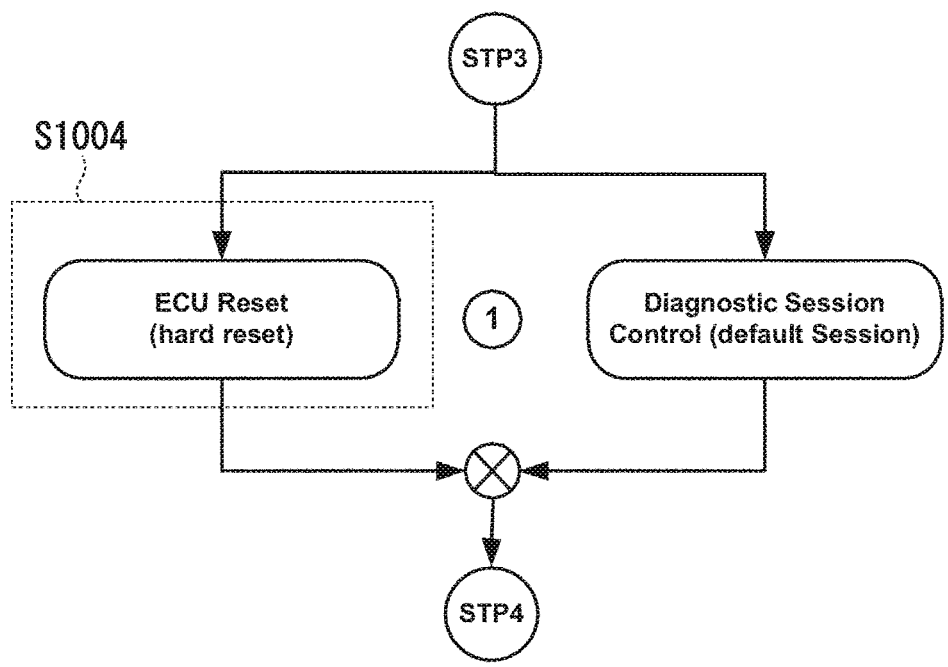
FIG. 8 is a flowchart showing a practical example of the data provision method according to an embodiment.

Next, an example of a relationship between the data security device 1010 and the ECU 1020 in the above-described data provision method of FIG. 5 will be described. FIGS. 6 to 8 are flowcharts showing examples of the data provision method according to the present embodiment. In the present embodiment, in "Non-volatile server memory programming process" of Chapter 15 described in Non-Patent Document 3, a procedure of "15.2.1.2 Programming step of phase #1—Download of application software and data" and a procedure of "15.2.1.3 Post-Programming step of phase #1—Re-synchronization of vehicle network" are used. In FIGS. 6 and 7, an application example in "graphically depicts the functionality embedded in the programming step of phase #1." of FIG. 33 of "15.2.1.2 Programming step of phase #1—Download of application software and data" described in Non-Patent Document 3 is shown. In FIG. 8, an application example in "graphically depicts the functionality embedded in the post-programming step of phase #1." of FIG. 34 of "15.2.1.3 Post-Programming step of phase #1—Re-synchronization of vehicle network" described in Non-Patent Document 3 is shown.

In FIG. 6, a step denoted by a reference sign S1001 corresponds to a security access process of the data security device 1010. In FIG. 7, a step denoted by a reference sign S1002 corresponds to a process of decrypting each block of the ECU code of the data security device 1010 and verifying a digital signature. In FIG. 7, a step denoted by a reference sign S1003 corresponds to an ECU code verification process of the ECU 1020. In FIG. 8, a step denoted by a reference sign S1004 corresponds to a secure boot process after the ECU code of the ECU 1020 is applied.

According to the above-described embodiment, the data security device 1010 verifies the electronic signature provided along with the ECU code from the server device 2000 and transmits the ECU code for which the verification of the electronic signature has succeeded to the ECU 1020. Accordingly, the reliability of the ECU code applied to the ECU 1020 can be improved.

In the above-described embodiment, the server device 2000 corresponds to a data provision device.

Also, the maintenance tool 2100 may have a function similar to that of the server device 2000 and to provide the ECU code to the ECU 1020 via the diagnostic port 1060 and the data security device 1010 in a data provision method similar to that of the server device 2000.

Further, the TCU 1050 or the gateway 1070 of the car 1001 may have the function of the data security device 1010.

Although embodiments of the present invention have been described above with reference to the drawings, specific configurations are not limited to the embodiments, and design changes and the like may also be included without departing from the scope of the present invention.

In the above-described embodiment, an HSM or an SHE is used for the data security device 1010 or the ECU 1020, but a cryptographic processing chip other than the HSM and the SHE may be used. For the data security device 1010, for example, a cryptographic processing chip called "trusted platform module (TPM) f (TMPf)" may be used. TPMf is tamper resistant. TPMf is an example of a secure element. For the ECU 1020, for example, a cryptographic processing chip called "TPMt" may be used. TPMt is tamper resistant. TPMt is an example of a secure element.

The above-described embodiment may be applied to an ECU installed in a car in a car manufacturing process in a car manufacturing factory. Also, the above-described embodiment may be applied to an ECU installed in a car in a car maintenance factory, a car store, or the like.

Although a car is an exemplary example of a vehicle in the embodiment described above, the present invention is also applicable to other vehicles other than a car such as a bicycle with a prime mover or a railway vehicle.

Also, processes may be performed by recording a computer program for implementing functions of each device described above on a computer-readable recording medium and causing a computer system to read and execute the program recorded on the recording medium. Also, the "computer system" described here may include an operating system (OS) and hardware such as peripheral devices.

Also, the "computer-readable recording medium" refers to a storage device including a flexible disk, a magneto-optical disc, a read only memory (ROM), a writable non-volatile memory such as a flash memory, a portable medium such as a digital versatile disc (DVD), and a hard disk embedded in the computer system.

Furthermore, the "computer-readable recording medium" is assumed to include a medium that holds a program for a fixed period of time, such as a volatile memory (for example, a dynamic random access memory (DRAM)) inside a computer system serving as a server or a client when the program is transmitted via a network such as the Internet or a communication circuit such as a telephone circuit.

Also, the above-described program may be transmitted from a computer system storing the program in a storage device or the like via a transmission medium or transmitted to another computer system by transmission waves in a transmission medium. Here, the "transmission medium" for transmitting the program refers to a medium having a function of transmitting information, such as a network (a communication network) like the Internet or a communication circuit (a communication line) like a telephone circuit.

Also, the above-described program may be a program for implementing some of the above-described functions.

Further, the above-described program may be a program capable of implementing the above-described functions in combination with a program already recorded on the computer system, i.e., a so-called differential file (differential program).

INDUSTRIAL APPLICABILITY

According to the present invention, it is possible to improve the reliability of data to be applied to an in-vehicle computer such as an ECU.

REFERENCE SIGNS LIST

22, 42, 2012 Storage unit
2013 Expected value calculation unit
2014 Verification unit
32, 52, 2016 Cryptographic processing unit
20, 40 Interface unit
21, 41 Control unit 53 Measurement unit
1001 Car
1002 In-vehicle computer system
1010 Data security device
1011, 1021 Main computing unit
1012 HSM
1013, 1023 Storage unit
1020 ECU
1022 SHE
1030 CAN
1040 Infotainment device
1050 TCU
1051 Communication module
1052 SIM
1060 Diagnostic port
1070 Gateway
2000 Server device
2011 Communication unit
2100 Maintenance tool

The invention claimed is:

1. A data provision system, comprising:
a data provision device;
a data security device installed in a vehicle; and
an in-vehicle computer installed in the vehicle,
wherein the data provision device includes:
  at least one first memory configured to store instructions; and
  at least one first processor configured to execute the instructions to,
  generate an electronic signature of a first data, which is a computer program or setting data to be applied to the in-vehicle computer, or a first expected value of the first data, or an electronic signature of the first data and an electronic signature of the first expected value, by using a secret key of the data provision device,
  transmit data with the electronic signature, which is obtained by attaching the electronic signature to the first data and the first expected value to the vehicle,
  transmit a verification value used for verifying a data application result indicating success or failure of application of the first data to the in-vehicle computer, to the vehicle, and
  receive the data application result from the vehicle, and determine that a result of application of the first data to the in-vehicle computer indicates success when the data application result includes the verification value and the verification value transmitted to the vehicle and the verification value included in the data application result match,
the data security device includes:
  at least one second memory configured to store instructions; and
  at least one second processor configured to execute the instructions to,
  verify the electronic signature of the data with the electronic signature received from the data provision device, by using a public key of the data provision device, and
  transmit the first data and the first expected value for which the verification of the electronic signature has succeeded to the in-vehicle computer,
the in-vehicle computer includes:
  at least one third memory configured to store instructions; and
  at least one third processor configured to execute the instructions to,
  apply the first data provided by the data provision device, to the in-vehicle computer, set the first expected value provided by the data provision device, as a second expected value for use in a secure boot, and execute the secure boot after applying the first data to the in-vehicle computer,
  calculate, in the secure boot, a measurement value of the first data applied to the in-vehicle computer, and verify the measurement value on the basis of the second expected value, and
  transmit the data application result, which includes the verification value received from the data provision device when the result of application of the first data to the in-vehicle computer based on a result of the verification indicates success and which does not include the verification value when the result of the application indicates failure, to the data provision device.

2. The data provision system according to claim 1,
wherein the at least one second processor of the data security device is configured to transmit the first data and a message authentication code for the first data to the in-vehicle computer when the verification of the electronic signature has succeeded.

3. The data provision system according to claim 2,
wherein the message authentication code is a message authentication code related to a packet that is configured to store the first data for which the verification of the electronic signature has succeeded, and to be transmitted to the in-vehicle computer.

4. The data provision system according to claim 2,
wherein the at least one second processor of the data security device is configured to divide the first data for which the verification of the electronic signature has succeeded into a plurality of blocks, calculate the message authentication code for each block, and transmit the block and the message authentication code to the in-vehicle computer.

5. A data provision method for use in a data provision system including a data provision device, a data security device installed in a vehicle, and an in-vehicle computer installed in the vehicle, the data provision method comprising:
generating, by the data provision device, an electronic signature of a first data, which is a computer program or setting data to be applied to the in-vehicle computer, or a first expected value of the first data, or an electronic signature of the first data and an electronic signature of the first expected value, by using a secret key of the data provision device;
transmitting, by the data provision device, data with the electronic signature, which is obtained by attaching the electronic signature to the first data and the first expected value, to the vehicle;
transmitting, by the data provision device, a verification value used for verifying a data application result indicating success or failure of application of the first data to the in-vehicle computer, to the vehicle;
verifying, by the data security device, the electronic signature of the data with the electronic signature received from the data provision device, by using a public key of the data provision device;
transmitting, by the data security device, the first data and the first expected value for which the verification of the electronic signature has succeeded to the in-vehicle computer;

applying, by the in-vehicle computer, the first data provided by the data provision device, to the in-vehicle computer, and setting the first expected value, provided by the data provision device, as a second expected value for use in a secure boot;

executing, by the in-vehicle computer, the secure boot after applying the first data to the in-vehicle computer, calculating, in the secure boot, a measurement value of the first data applied to the in-vehicle computer, and verifying the measurement value on the basis of the second expected value;

transmitting, by the in-vehicle computer, the data application result, which includes the verification value received from the data provision device when a result of application of the first data to the in-vehicle computer based on a result of the verification indicates success and which does not include the verification value when the result of the application indicates failure, to the data provision device; and receiving, by the data provision device, the data application result from the vehicle, and determining that the result of application of the first data to the in-vehicle computer indicates success when the data application result includes the verification value and the verification value transmitted to the vehicle and the verification value included in the data application result match.

* * * * *